(12) United States Patent
Philipps et al.

(10) Patent No.: US 12,104,363 B2
(45) Date of Patent: Oct. 1, 2024

(54) SANITARY FAUCET AND METHOD OF ASSEMBLING SUCH A SANITARY FAUCET

(71) Applicant: Grohe AG, Hemer (DE)

(72) Inventors: Hartwig Philipps, Menden (DE); Pia Schadow, Hemer (DE)

(73) Assignee: GROHE AG, Hemer (DE)

( * ) Notice: Subject to any disclaimer, the term of this patent is extended or adjusted under 35 U.S.C. 154(b) by 156 days.

(21) Appl. No.: 17/801,104

(22) PCT Filed: Feb. 12, 2021

(86) PCT No.: PCT/EP2021/053460
§ 371 (c)(1),
(2) Date: Aug. 19, 2022

(87) PCT Pub. No.: WO2021/165153
PCT Pub. Date: Aug. 26, 2021

(65) Prior Publication Data
US 2023/0106648 A1    Apr. 6, 2023

(30) Foreign Application Priority Data
Feb. 20, 2020 (DE) ..................... 10 2020 104 457.7

(51) Int. Cl.
*E03C 1/04* (2006.01)
*E03C 1/02* (2006.01)
*F16K 27/04* (2006.01)

(52) U.S. Cl.
CPC .......... *E03C 1/0403* (2013.01); *F16K 27/044* (2013.01); *E03C 2001/026* (2013.01)

(58) Field of Classification Search
CPC ................. E03C 1/0403; E03C 1/0404; E03C 2001/026; F16K 27/044; F16K 27/045
USPC ............... 4/675–678; 137/801; 251/153, 155
See application file for complete search history.

(56) References Cited

U.S. PATENT DOCUMENTS

2019/0376608 A1\* 12/2019 Tsuruda ................ F16K 27/044

FOREIGN PATENT DOCUMENTS

| DE | 10 2011 076 829 | 12/2012 |
|----|-----------------|---------|
| EP | 2 108 748       | 10/2009 |
| GB | 2461139         | 12/2009 |

OTHER PUBLICATIONS

International Search Report issued May 19, 2021, in International (PCT) Application No. PCT/EP2021/053460, with English translation.

\* cited by examiner

*Primary Examiner* — Tuan N Nguyen
(74) *Attorney, Agent, or Firm* — Wenderoth, Lind & Ponack, L.L.P.

(57) ABSTRACT

A sanitary faucet (1) containing a faucet body (2) with an outlet (4) having an outlet opening (3); a valve adapter (5) disposed in the faucet body (2); a valve (6) for at least partially closing off the outlet opening (3), which is at least partially disposed in the valve adapter (5); and a connection element (7) for connecting a water guide (8) disposed in the outlet (4) to a water aperture (9) of the valve adapter (5), wherein a linear slide guide (10) is used to attach the connection element (7) to the valve adapter (5). In addition, a method of assembling a sanitary faucet (1) is proposed.

9 Claims, 2 Drawing Sheets

SANITARY FAUCET AND METHOD OF ASSEMBLING SUCH A SANITARY FAUCET

This invention relates to a sanitary faucet, which can be used in particular for washbasins, showers and/or bathtubs. In addition, this invention relates to a method of assembling a such a sanitary faucet.

Sanitary faucets are used in particular to provide water and/or to mix a cold water and a hot water to form a mixed water having a desired mixed-water temperature and to meter the mixed mixed water. In known sanitary faucets, water from a valve or mixed water from a mixing valve is routed to an outlet opening of an outlet of the faucet body through fluid ducts in a faucet body. Because the water is in contact with the faucet body during this process, faucet bodies have to be made of a material suitable for drinking water, such as brass. To be able to use less expensive materials, such as zinc or zinc alloys, for faucet bodies, the fluid ducts inside the faucet body have to be designed, for instance, in the form of plastic water guides such that the mixed water does not come into contact with the faucet body. The size and position of a connection between a water guide of the outlet to a faucet body of the valve or a valve adapter of the valve or the mixing valve of the sanitary faucet is particularly problematic, because the connection requires either an enlargement of a diameter of the faucet body or a multi-part design of the faucet body.

The invention therefore addresses the problem of at least partially solving the problems described with reference to the prior art and, in particular, to specify a sanitary faucet, in which a connection between the water guide of the outlet and a valve adapter of the valve is designed in such a way that an integrally formed faucet body can be used without increasing the body diameter. In addition, a method of assembling a sanitary faucet, in which a connection between the water guide of the outlet and a valve adapter of the valve is formed such that an integrally formed faucet body can be used without increasing the body diameter, is also disclosed.

These problems are solved by a sanitary faucet and a method having the features of the independent claims. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary faucet having at least the components listed below contributes to solving the problem:
- a faucet body with an outlet having an outlet opening;
- a valve adapter disposed in the faucet body;
- a valve for at least partially closing off the outlet opening, which is at least partially disposed in the valve adapter; and
- a connection element for connecting a water guide disposed in the outlet to a water aperture of the valve adapter, wherein a linear slide guide is used to attach the connection element to the valve adapter.

The body can be used in particular for a sanitary faucet, which is used to mix a cold water and a hot water to form a mixed water having a desired mixed-water temperature and/or to meter the mixed water. Such sanitary faucets are routinely used for sinks, washbasins, showers and/or bathtubs. The sanitary faucet has a faucet body with an outlet having an outlet opening, wherein the faucet body can be at least partially made of brass, a zinc alloy and/or plastic. In particular, the faucet body is integrally formed, i.e. it is not composed of two (half) shells. Furthermore, the faucet body can be attached to a support, such as a countertop, the sink, the wash basin, or the bathtub. Furthermore, the faucet body has a (protruding or branching) outlet that is rigidly or movably connected to the faucet body. The outlet can be formed to be at least partially tubular. Furthermore, the faucet body may have a decorative outer surface. Furthermore, the outlet has an outlet opening, through which a liquid, in particular (mixed) water, can be dispensed.

A valve adapter is disposed in the faucet body for mounting and/or securing a valve to the faucet body. The valve adapter is designed in particular in the manner of a cartridge adapter. In addition, the valve adapter can be at least partially tubular, i.e., the valve can be disposed at least partially in the valve adapter. The tubular portion of the valve adapter extends, in particular, along a longitudinal axis. Furthermore, the valve adapter may be at least partially made of brass and/or plastic. The valve adapter may be directly or indirectly attached to the faucet body, for instance by further components of the sanitary faucet.

The valve can be used to at least partially shut off the outlet opening. This means in particular that the valve can be used to prevent or throttle water from flowing from the outlet opening. In addition, the valve can also be designed in the manner of a mixing valve or a mixing cartridge. The mixing valve or mixing cartridge can be used in particular to mix cold water at a cold-water temperature and hot water at a hot-water temperature to form mixed water at a desired mixed-water temperature. The cold-water temperature is in particular at most 25° C. (Centigrade), preferably 1° C. to 25° C., particularly preferably 5° C. to 20° C. and/or the hot-water temperature is in particular at most 90° C., preferably 25° C. to 90° C., particularly preferably 55° C. to 65° C. The valve can be disposed or secured at least partially in the valve adapter and/or a mounting space of the valve adapter. In addition, a lever of the sanitary faucet can be used to operate the valve. For instance, the lever can be used to adjust the mixed-water temperature and/or a discharge quantity of the mixed water or water. The mixing valve or mixing cartridge can be designed, for instance, in the manner of a single-lever mixer and/or at least partially cylindrically. Further, the valve may include a cartridge housing.

Furthermore, the sanitary faucet comprises a connection element for connecting a water guide disposed in the outlet to a water aperture of the valve adapter. The water guide can be a mixed-water guide. The water flowing through the valve or the mixed water mixed by the valve flows, in particular, from a water outlet of the valve into a mounting space of the valve adapter and from there through the water aperture of the valve adapter into the water guide of the outlet via the connection element. For this purpose, a water duct can be formed in the connection element. The water guide can, for instance, be designed as a pipe or (flexible) hose and/or extend through the outlet to the outlet opening. The connection element can at least partially be made of brass or plastic.

Furthermore, a linear slide guide is used to attach the connection element to the valve adapter. The linear slide guide permits the connection element to be (only) moved or displaced (in a sliding manner) linearly on the valve adapter, in particular in a longitudinal direction, i.e. in particular in parallel to the longitudinal axis of the valve adapter. Furthermore, the linear slide guide allows the connection element to be detached from the valve adapter, in particular only by a motion in the longitudinal direction. The linear slide guide can be formed by a ridge of the valve adapter, which engages with a bearing groove of the connection element and which can (only) be linearly moved in the bearing groove, i.e. in one (single) direction (back and forth). In particular, the ridge and the bearing groove are designed such that the valve adapter and the connection element are interconnected in a form-fitting manner, in particular in a radial direction of the valve adapter, i.e., in particular orthogonally to the longitudinal direction. To this end, the ridge and/or the bearing groove can at least in part have a trapezoidal cross-section.

The linear slide guide enables the connection element (without the valve adapter) to first be disposed at least partially in the outlet and only then to insert the valve adapter in the faucet body. When the valve adapter is inserted into the faucet body, the ridge can engage with the bearing groove of the connection element such that the connection element is attached to the valve adapter and secured in its position in the outlet. A seal, for instance having the form of an O-ring, can be disposed in the area of the water aperture of the valve adapter, which seal is compressed between the valve adapter and the connection element when the ridge is inserted into the bearing groove. The reaction force generated by compressing the seal is not transmitted by the entire diameter of the valve adapter, but only in the area of the linear slide guide, which means that any deformation of the valve adapter can be prevented. By using the linear slide guide to secure the connection element to the valve adapter, an increase in the body diameter of the faucet body and/or a multi-part design of the faucet body can be avoided.

The linear slide guide can be used to attach the connection element to an outer circumferential surface of the valve adapter.

The linear slide guide can be designed as a dovetail guide.

The connection element may have a dovetail groove. In that case, the bearing groove is designed as a dovetail groove with an at least partially dovetail-shaped cross-section. Furthermore, the ridge of the valve adapter can also have a dovetail-shaped cross-section, at least in part. Owing to the dovetail-shaped cross-section of the ridge and the dovetail groove, the ridge can only be moved in one direction in the dovetail groove.

The connection element may have a tube segment. In particular, the tube segment is tubular and extends from a first longitudinal end to a second longitudinal end.

The connection element may have a connecting section. The connecting section is formed in particular at the second longitudinal end of the tube segment and/or in the manner of a flange. The bearing groove or dovetail groove is formed, in particular, on the connecting section of the connection element.

A seal can be disposed between the connection element and the valve adapter. The seal can be designed in particular in the manner of an O-ring.

The water guide may be inserted into the connection element. In particular, the water guide can be inserted through the outlet opening into the connection element or into the first longitudinal end of the tube segment of the connection element.

The connection element may be disposed at least partially in the outlet.

According to a further aspect, a method for assembling a sanitary faucet is also proposed, comprising at least the steps listed below:

a) providing a faucet body with an outlet having an outlet opening;

b) disposing a connection element for connecting a water guide disposed in the outlet to a water aperture of a valve adapter at least partially in the outlet; and c) disposing the valve adapter in the faucet body such that a linear slide guide is used to secure the connection element to the valve adapter.

After providing the faucet body in step a), in a step b) the connection element, in particular its tube segment, is disposed in the outlet and a bearing groove of the connection element is aligned perpendicularly or in a longitudinal direction of a valve adapter. Subsequently, in step c), the valve adapter is inserted into the faucet body, in particular via a cartridge opening of the faucet body. In so doing, a ridge of the valve adapter is inserted into the bearing groove of the connection element such that the ridge and the bearing groove form a linear slide guide. The linear slide guide attaches the connection element to the valve adapter and secures it in its position in the outlet. For further details, full reference can be made to the description of the sanitary faucet proposed here.

The invention and the technical environment are explained in more detail below with reference to the figures. It should be noted that the figures show a particularly preferred embodiment variant of the invention, but the invention is not limited thereto. The same reference signs are used for the same components in the figures. Schematically:

Figure 1:
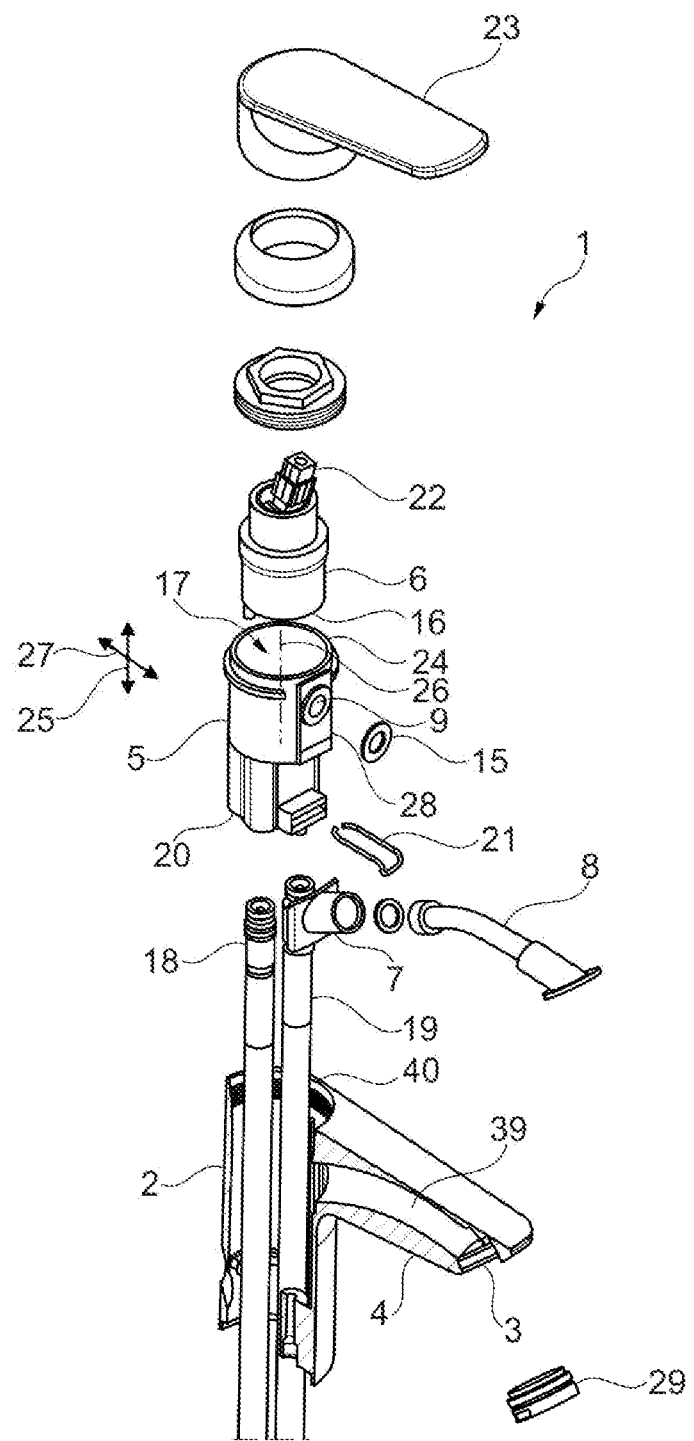
FIG. 1 shows an exploded view of a sanitary faucet.

FIG. 1 shows an exploded view of the sanitary faucet 1. The sanitary faucet 1 has a faucet body 2 having an outlet 4 with an outlet opening 3. A valve adapter 5 is disposed in the faucet body 2, which valve adapter has a mounting space 17 for mounting a valve 6 and which valve adapter is designed in the manner of a cartridge adapter. The valve 6 is designed in particular in the manner of a mixing cartridge. The mounting space 17 extends in a longitudinal direction 25, i.e. in parallel to a longitudinal axis 26 of the valve adapter 5, from an upper end face 24 of the valve adapter 5 to a bottom (not visible here) of the mounting space 17 within the valve adapter 5. The valve adapter 5 is designed to be tubular in the area of the mounting space 17. The valve 6 has a lower end face 16, on which the valve 6 sits on the bottom of the mounting space 17 of the valve adapter 5. A cold-water duct and a hot-water duct, also not shown here, are formed in the valve adapter 5 and extend from a bottom end 20 of the valve adapter 5 to the bottom of the mounting space 17. A cold-water line 18 can be connected to the cold-water duct at the bottom 20 of the valve adapter 5, and a hot-water line 19 can be connected to the hot-water duct at the bottom end 20 of the valve adapter 5. Furthermore, a clip 21 that can be inserted into the valve adapter 5 can be used to secure the cold-water line 18 and the hot-water line 19 such that the cold-water line 18 cannot detach from the cold-water duct and the hot-water line 19 cannot detach from the hot-water duct of the valve adapter 5. The cold-water duct and the hot-water duct of the valve adapter 5 open into a cold-water inlet and hot-water inlet of the valve 6 at the bottom of the mounting space 17. The cold-water inlet and the hot-water inlet are formed on the lower end face 16 of the valve 6. Inside the valve 6 the cold water and the hot water can be mixed to form a mixed water having a desired mixed-water temperature. The valve 6 has an actuating element 22 connected to a lever 23 for setting the mixed-water temperature and a discharge quantity of the mixed water through the sanitary faucet 1.

The mixed water mixed by the valve 6 enters the mounting space 17 of the valve adapter 5 at the lower end face 16 from a mixed water outlet of the valve 6, which cannot be seen here. The valve 6 closes the mounting space 17 in the area of the upper end face 24 of the valve adapter 5, such that the mixed water can only leave the mounting space 17 via a water aperture 9. For this purpose, the valve 6 has an outer diameter from its lower end face 16 to the water aperture 9 that is smaller than an inner diameter of the mounting space 17 such that in the longitudinal direction 25 the mixed water can flow through an annular gap formed by the valve 6 and the valve adapter 5 to the water aperture 9. The water aperture 9 is formed in the longitudinal direction 25 in the area of the valve 6 and extends in a radial direction 27, i.e. orthogonally to the longitudinal direction 25, through a side wall 28 of the valve adapter 5. From the water aperture 9, the mixed water can be supplied to the outlet opening 3 of the outlet 4 through a connection element 7 and a water guide 8. A mousseur 29 is disposed in the outlet opening 3, through which the mixed water leaves the outlet 4.

Figure 2:
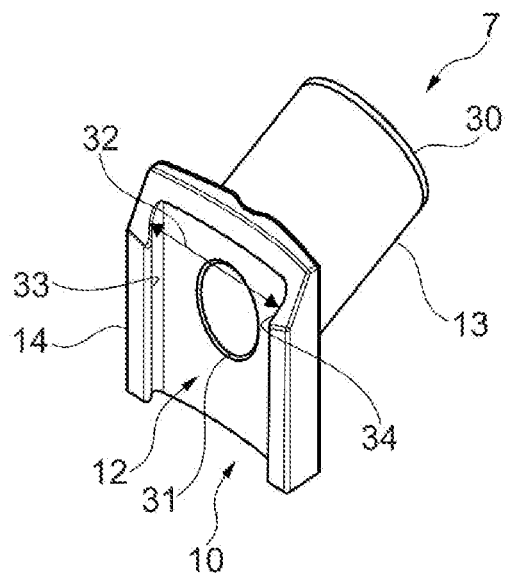
FIG. 2 shows a perspective view of a connection element of the sanitary faucet.

FIG. 2 shows a perspective view of the connection element 7. The connection element 7 has a tube segment 13 extending from a first longitudinal end 30 to a second longitudinal end 31. The water guide 8 shown in FIG. 1 can be inserted into the first longitudinal end 30. A connecting section 14 of the connection element 7 adjoins the second longitudinal end 31 of the tube segment 13, which connecting section is designed in the manner of a flange. The connecting section 14 includes a dovetail groove 12 having a first side surface 33 and a second side surface 34 that are designed as mirror images with respect to each other and extend in parallel to each other. Furthermore, the dovetail groove 12 has a first width 32 that increases (at least sectionally) toward the first longitudinal end 30. Thus, the dovetail groove 12 has a (mainly) trapezoidal or dovetailed cross-section.

Figure 3:
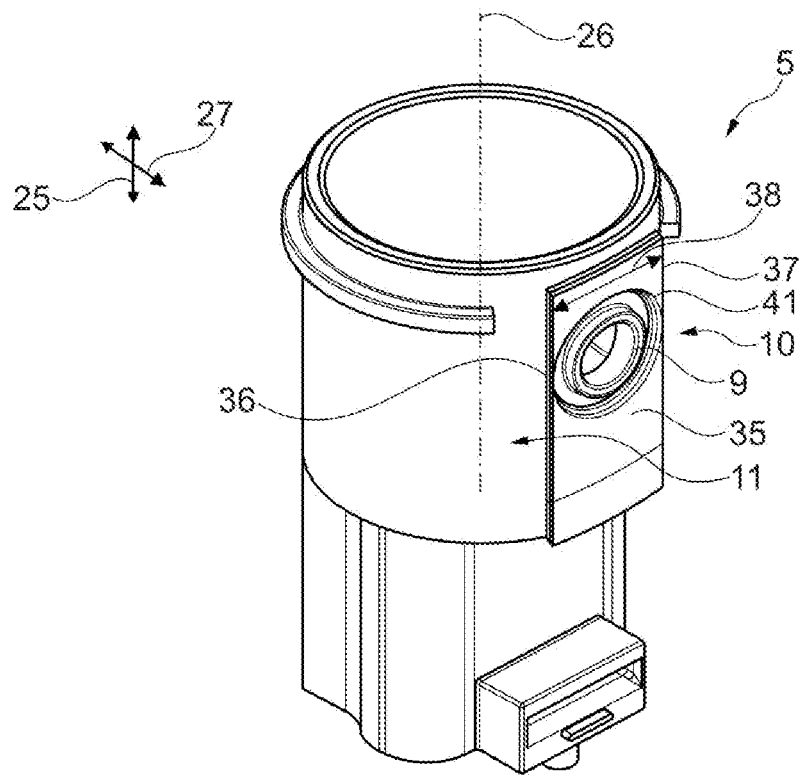
FIG. 3 shows a perspective view of a valve adapter of a sanitary faucet.

FIG. 3 shows a perspective view of the valve adapter 5. A ridge 35 is formed on an outer circumferential surface 11 of the valve adapter 5 in the area of the water aperture 9. The ridge 35 protrudes from the outer circumferential surface 11 in the radial direction 27. In addition, the ridge 35 has a first side flank 36 and a second side flank 37, which extend in the longitudinal direction 25 and in parallel to the longitudinal axis 26, respectively, and are designed as mirror images with respect to each other. Between the first side flank 36 and second side flank 37, the ridge 35 has a second width 38 that increases outwards in the radial direction 27. As a result, the ridge 35 also has a (mainly) trapezoidal or dovetail-shaped cross-section. The ridge 35 is configured to slide in the longitudinal direction 25 or in parallel to the longitudinal axis 26 in the dovetail groove 12 of the connection element 7 shown in FIG. 2. Furthermore, the ridge 35 is formed in such a way that it can only be inserted (completely) into the dovetail groove 12 of the connection element 7 in the longitudinal direction 25. The dovetail groove 12 of the connection element 7 and the ridge 35 are part of a linear slide guide 10, which can be used to attach the connection element 7 to the outer circumferential surface 11 of the valve adapter 5. When the ridge 35 is in the dovetail groove 12 of the connection element 7, the connection element 7 is connected to the valve adapter 5 in the radial direction 27 in a form-fitting manner and can be detached from the valve adapter 5 only in the longitudinal direction 25. Around the water aperture 9, an annular groove 41 is formed in the ridge 35 for a seal 15, which is an O-ring, shown in FIG. 1.

When assembling the sanitary faucet 1 shown in FIG. 1, the faucet body 2 is first provided in a step a). Subsequently, in a step b), the tube segment 13 of the connection element 7 shown in FIG. 2 is inserted into a guide duct 39 of the outlet 4 in such a way that the dovetail groove 12 of the connection element 7 is aligned in the longitudinal direction 25 or vertically. Then, in a step c), the valve adapter 5 is inserted into the faucet body 2 through a cartridge opening 40 of the faucet body 2 such that the ridge 35 of the valve adapter 5 is inserted into the dovetail groove 12 of the connection element 7. In this way, the linear slide guide 10 formed by the dovetail groove 12 and the ridge 35 is used to secure the connection element 7 to the valve adapter 5 and is secured in the guide duct 39 of the outlet 4. After step c), the seal 15 is compressed in the groove 41 between the valve adapter 5 and the connection element 7. Subsequently, in a step d), the water guide 8 can be inserted via the outlet opening through the guide duct 39 into the tube segment 13 of the connection element 7 such that the mixed water outlet of the valve 6 is connected in a fluid-conveying manner to the outlet opening 3 of the outlet without the mixed water coming into contact with the faucet body 2 or the outlet 4.

Based on this invention, a water guide of an outlet can be connected to a water aperture of a valve adapter without increasing a body diameter of a faucet body and without using a multi-part design of the faucet body.

LIST OF REFERENCE NUMERALS 1 sanitary faucet
2 faucet body
3 outlet opening
4 outlet
5 valve adapter
6 valve
7 connection element
8 water guide
9 water aperture
10 linear slide guide
11 outer circumferential surface
12 dovetail groove
13 tube segment
14 connection section
15 seal
16 lower end face
17 mounting space
18 cold-water line
19 hot-water line
20 bottom end
21 clip
22 actuating element
23 lever
24 upper end face
25 longitudinal direction
26 longitudinal axis
27 radial direction
28 side wall
29 aerator
30 first longitudinal end
31 second longitudinal end
32 first width
33 first side surface
34 second side surface
35 ridge
36 first side flank 37 second side flank
38 second width
39 guide duct
40 cartridge opening
41 groove

The invention claimed is:

1. A sanitary faucet (1) comprising:
    a faucet body (2) with an outlet (4) having an outlet opening (3);
    a valve adapter (5) disposed in the faucet body (2);
    a valve (6) for at least partially closing off the outlet opening (3), wherein the valve (6) is at least partially disposed in the valve adapter (5); and
    a connection element (7) for connecting a water guide (8) disposed in the outlet (4) to a water aperture (9) of the valve adapter (5), wherein the connection element (7) has a tube segment (13),
    wherein a linear slide guide (10) is used to attach the connection element (7) to the valve adapter (5).

2. The sanitary faucet (1) according to claim 1, wherein the linear slide guide (10) is used to secure the connection element (7) to an outer circumferential surface (11) of the valve adapter (5).

3. The sanitary faucet (1) according to claim 1, wherein the linear slide guide (10) is designed as a dovetail guide.

4. The sanitary faucet (1) according to claim 1, wherein connection element (7) has a dovetail groove (12).

5. The sanitary faucet (1) according to claim 1, wherein connection element (7) has a connecting section (14).

6. The sanitary faucet (1) according to claim 1, wherein a seal (15) is disposed between the connection element (7) and the valve adapter (5).

7. The sanitary faucet (1) according to claim 1, wherein the water guide (8) is inserted into the connection element (7).

8. The sanitary faucet (1) according to claim 1, wherein the connection element (7) is disposed at least partially inside the outlet (4).

9. A method for assembling a sanitary faucet (1) according to claim 1 comprising the steps outlined below:
    a) providing the faucet body (2) with the outlet (4) having the outlet opening (3);
    b) disposing the connection element (7) at least partially in the outlet (4) for connecting the water guide (8) disposed in the outlet (4) to the water aperture (9) of the valve adapter (5); and
    c) disposing the valve adapter (5) in the faucet body (2) such that the linear slide guide (10) is used to secure the connection element (7) to the valve adapter (5).

* * * * *